United States Patent
Yamatani et al.

(10) Patent No.: US 7,333,334 B2
(45) Date of Patent: Feb. 19, 2008

(54) LIQUID COOLING SYSTEM AND ELECTRONIC EQUIPMENT USING THE SAME

(75) Inventors: Takaaki Yamatani, Toyokawa (JP); Ichiro Asano, Seto (JP); Junya Ide, Toyokawa (JP); Sumihiro Tono, Toyokawa (JP); Tsunenori Takeuchi, Okazaki (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 11/012,118

(22) Filed: Dec. 16, 2004

(65) Prior Publication Data

US 2005/0141196 A1  Jun. 30, 2005

(30) Foreign Application Priority Data

Dec. 17, 2003  (JP)  ............................ 2003-419673

(51) Int. Cl.
  *H05K 7/20* (2006.01)
  *H01B 9/06* (2006.01)
  *F28F 7/00* (2006.01)

(52) U.S. Cl. ............... 361/701; 361/702; 174/15.1; 174/15.2; 165/80.4; 165/122

(58) Field of Classification Search ............... 454/184; 211/41.17; 312/223.2; 439/487; 62/259.2; 165/80.4, 122; 174/15.1–15.2, 16.3; 361/699, 361/752, 755, 689; 415/213.1
See application file for complete search history.

(56) References Cited

U.S. PATENT DOCUMENTS

| | | | | |
|---|---|---|---|---|
| 5,941,300 A | * | 8/1999 | Colling et al. ............... 165/47 |
| 5,992,168 A | * | 11/1999 | Pfister et al. ............... 62/259.2 |
| 6,116,039 A | * | 9/2000 | Pfister et al. ............... 62/259.2 |
| 6,166,907 A | * | 12/2000 | Chien .......................... 361/699 |
| 6,333,849 B1 | * | 12/2001 | Donahoe et al. ............ 361/687 |
| 6,351,381 B1 | * | 2/2002 | Bilski et al. ................ 361/695 |
| 6,778,394 B2 | * | 8/2004 | Oikawa et al. ............. 361/700 |
| 6,807,056 B2 | * | 10/2004 | Kondo et al. ............... 361/689 |
| 6,967,842 B2 | * | 11/2005 | Aoki et al. .................. 361/701 |
| 6,989,990 B2 | * | 1/2006 | Malone et al. .............. 361/699 |
| 7,055,341 B2 | * | 6/2006 | Nori et al. .................. 62/259.2 |
| 2004/0008483 A1 | * | 1/2004 | Cheon .......................... 361/687 |
| 2004/0221604 A1 | * | 11/2004 | Ota et al. .................. 62/259.2 |
| 2005/0180105 A1 | * | 8/2005 | Matsushima et al. ....... 361/699 |
| 2005/0241799 A1 | * | 11/2005 | Malone et al. ............. 165/80.1 |
| 2005/0241803 A1 | * | 11/2005 | Malone et al. ............. 165/80.4 |
| 2005/0259397 A1 | * | 11/2005 | Bash et al. ................. 361/699 |
| 2006/0002080 A1 | * | 1/2006 | Leija et al. ................. 361/687 |

FOREIGN PATENT DOCUMENTS

| | | |
|---|---|---|
| JP | 64-084699 | 3/1989 |
| JP | 02-244748 | 9/1990 |
| JP | 06-097338 | 4/1994 |
| JP | 10-213370 | 8/1998 |

* cited by examiner

*Primary Examiner*—Anatoly Vortman
*Assistant Examiner*—Bradley H Thomas
(74) *Attorney, Agent, or Firm*—Antonelli, Terry, Stout & Kraus, LLP.

(57) ABSTRACT

For cooling of an electronic equipment, a heat receiving jacket, to which piping extended outside the electronic equipment is connected, is mounted to a heat generating element in the electronic equipment, a radiator, a cooling-liquid tank, a pump, and a pipe, which joins them, are constructed as an external module, and the external module is mounted externally and fixed to a housing of the electronic equipment. Cooling liquid is circulated by the pump through the heat receiving jacket, the radiator, and the tank to achieve cooling.

13 Claims, 7 Drawing Sheets

BACK SURFACE

FRONT SURFACE

LIQUID COOLING SYSTEM AND ELECTRONIC EQUIPMENT USING THE SAME

CROSS-REFERENCE TO RELATED APPLICATION

This application relates to and claims priority from Japanese Patent Application No. 2003-419673, filed on Dec. 17, 2003, the entire disclosure of which is incorporated herein by reference.

BACKGROUND OF THE INVENTION

The present invention relates to a liquid cooling system and an electronic equipment, and more particularly, to a liquid cooling system fixable to an outside of a housing of an electronic equipment and an electronic equipment using the same.

Semiconductor devices such as CPUs, etc. used in an electronic equipment such as a computer, etc. generate heat in operation, and such generated heat is further increased because high integration of semiconductors advances especially in recent years. Since semiconductors constituting CPUs, etc. lose the function as semiconductors when exceeding a certain temperature, it is necessary to cool semiconductor devices, which generate a large quantity of heat. For cooling semiconductor devices in an electronic equipment, there are known cooling methods with thermal conduction, with air cooling, with a heat pipe, and with liquid cooling.

In the cooling method utilizing thermal conduction, material having a large thermal conductivity is used for a radiation path extending from semiconductor devices to an outside of an electronic equipment. This method is suited for electronic equipment, in which the heat generated from the semiconductor devices is relatively small in quantity and which is compact like a notebook-sized personal computer.

In the cooling method utilizing air cooling, a blowing device such as a fan is provided within the electronic equipment so as to forcedly cool the semiconductor devices by convection. This method is widely used for cooling of semiconductor devices which generate a certain quantity of heat, and is also applied to a personal computer by making the blowing device small in size and thin.

The cooling method utilizing a heat pipe is made to be more efficient than the cooling method utilizing thermal conduction, and refrigerant encapsulated in the pipe transfers heat outside of the electronic equipment, which is known as described in JP-A-64-84699 and JP-A-2-244748. This method needs no use of parts which consume electric power, like a blowing device, and can perform efficient cooling.

In addition to the above cooling techniques, there is used a liquid cooling system for transferring heat with a cooling liquid. The concrete method with liquid cooling is known as described in, for example, JP-A-10-213370. In this method, a radiator, a pump, and a heat receiving jacket are arranged such that the heat receiving jacket is connected to the radiator and the pump by a suitable pipeline. The cooling liquid is transported to the heat receiving jacket by the pump so as to absorb heat from the heat generating body, and the heated cooling liquid is transported to the radiator to be cooled. That is, the pump circulates the cooling liquid so as to continuously transfer the heat received by the heat receiving jacket to the radiator and radiate it. Owing to the use of the cooling liquid, this method can perform more efficient cooling and is suited to cooling of semiconductor devices, which generate a large quantity of heat.

In a cooling system utilizing the liquid cooling method, a cooling subject is liquid for heat transfer such as water, a nonfreezing fluid containing glycol, etc. Thus, it is necessary to provide a construction which prevents leakage of the cooling liquid at the time of maintenance or the like. As a conventional technique with respect to such cooling system taking account of leakage of the cooling liquid, there is known a technique described in, for example, JP-A-6-97338. With this conventional technique, an electronic equipment comprises at least two housings, that is, an electronic equipment housing, which accommodates therein heat generating semiconductor parts being cooled by the cooling liquid, and a cooling-liquid cooling housing, which accommodates therein cooling-liquid cooling means to cool the cooling liquid, cooling-liquid supply means to supply the cooled cooling liquid to the heat generating semiconductor parts, and the like, and the respective housings and pipes are connected together so that a whole electronic equipment can be handled as an integral structure. This conventional technique is suited to cooling of semiconductor devices, which generate a large quantity of heat, and is excellent in maintenance.

The conventional technique described in JP-A-64-84699 and JP-A-2-244748 has a limit in transferable quantity of heat and involves a problem that sufficient cooling cannot be achieved in cooling semiconductor devices, such as CPU, etc., which generate a large quantity of heat.

Also, with the conventional technique described in JP-A-10-213370, the liquid cooling system is stored in the housing of the electronic equipment, so that exchange of the pump, the radiator, etc. must be made at the time of maintenance or the like without cooling-liquid spilling into the housing. Methods for such exchange include two methods, that is, one for exchange of a liquid cooling system as a whole, and other for exchange each element, for example, a radiator, a pump, and the like. With the former method, there is caused a problem that the liquid cooling system is clamped over an entire area of the housing and so man-hour equivalent to that for disassembly of the apparatus is needed. Also, with the latter method, there is caused a problem that exchange must be made after drying subsequent to discharge of the cooling liquid, or made in a manner to prevent leakage of the cooling liquid, which requires complex man-hour.

Further, the conventional technique described in the above JP-A-6-97338 involves a problem that it is necessary to make the electronic equipment housing an exclusive one with a view to utilization of the liquid cooling system and to determine the liquid cooling system in view of a direction, in which the electronic equipment is installed. The reason for this is that since the liquid cooling system is constructed to unite with a tank for a cooling liquid, a distance between the liquid surface and inlet and exhaust ports of the tank cannot be made sufficient when orientation of the housing is changed, whereby air is mixed in the cooling liquid to cut off flow of the liquid, and the cooling capacity is lost, in particular, in case of a small-sized pump.

BRIEF SUMMARY OF THE INVENTION

It is an object of the invention to solve the above problems involved in the conventional techniques and to provide a liquid cooling system, of which constituent parts inside an electronic equipment housing are made minimum and which can replace the liquid cooling systems of the above conventional techniques other than the liquid cooling, and an electronic equipment making use of the liquid cooling system.

Also, it is a further object of the invention to provide a liquid cooling system, in which a cooling capacity can be maintained in an electronic equipment housing provided with the liquid cooling system irrespective of a direction, in which the housing is installed, and liquid spill inside the electronic equipment housing can be prevented at the time of exchange of the liquid cooling system to dispense with exchange of the whole liquid cooling system and to shorten time for exchange, and an electronic equipment making use of the liquid cooling system.

According to the invention, the above object is attained by a liquid cooling system for an electronic equipment constructed to include a heat generating element to be cooled, in which liquid cooling system a heat receiving jacket, to which a pipe extended outside the electronic equipment is connected, is mounted to the heat generating element in the electronic equipment, a radiator, a cooling-liquid tank, a pump, and a pipe, which joins them, are constructed as an external module, the external module is mounted externally and fixed to a housing of the electronic equipment, and the pump circulates cooling liquid through the heat receiving jacket, the radiator, and the tank.

In the liquid cooling system described above, cooling of the radiator is carried out by one or both of a fan mounted to the external module and a fan provided inside the electronic equipment.

Other objects, features and advantages of the invention will become apparent from the following description of the embodiments of the invention taken in conjunction with the accompanying drawings.

DETAIL DESCRIPTION OF THE INVENTION

Figure 1:
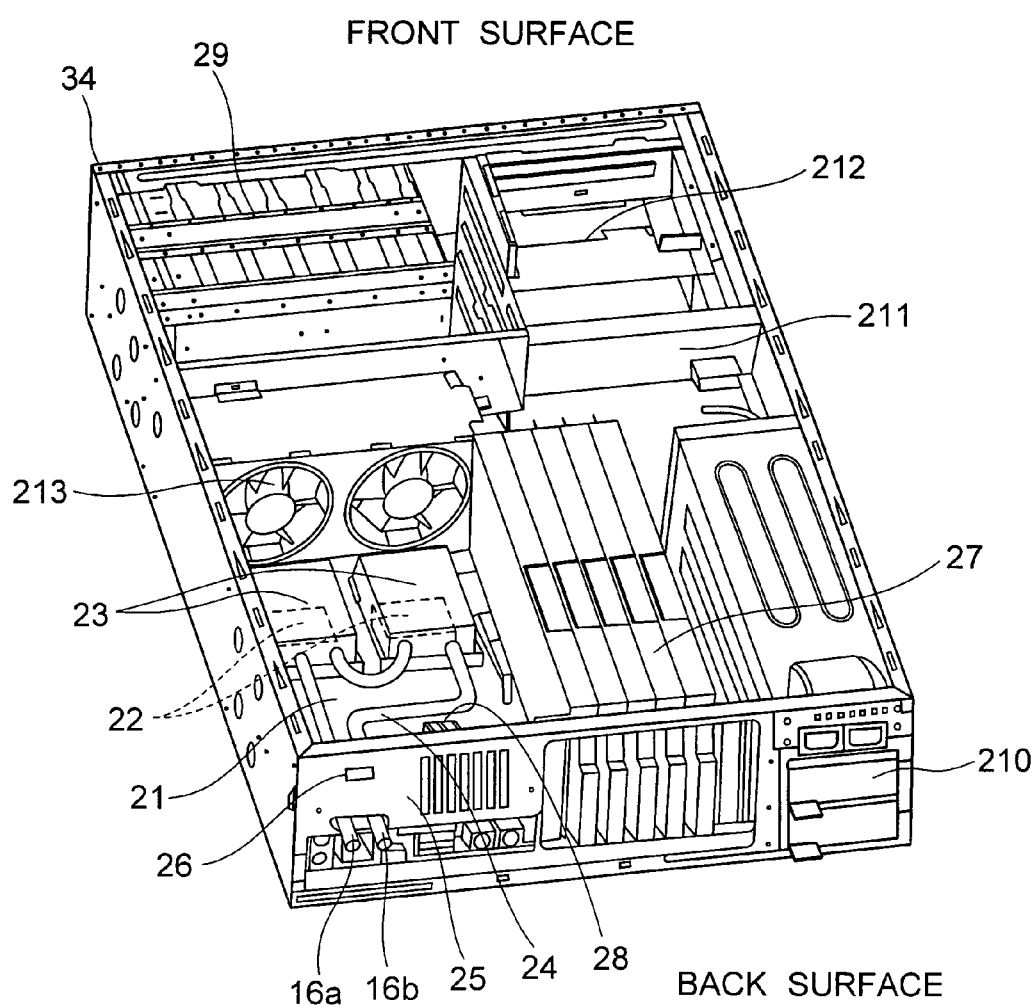
FIG. 1 is a perspective view showing the fundamental construction of a PC server as an electronic equipment, on which a liquid cooling system according to the invention is mounted.

FIG. 1 is a perspective view showing a fundamental construction of a personal computer (referred below to as PC server) as an electronic equipment, on which a liquid cooling system according to the invention is mounted, and an interior of the PC server with a roof cover removed is viewed from a back surface side thereof in the perspective view. In FIG. 1, the reference numeral 34 denotes a PC server body, 21 a mother board, 22 CPUs, 24 piping, 25 a back surface panel, 26 a connector, 27 a PCI card device, 28 a memory, 29 a HDD, 210 a power supply, 211 a 5-inch device, 212 a FD/CD drive, 213 fans, 23 heat receiving jackets, and 16a, 16b joints.

An example of a PC server as an electronic equipment, to which the invention is applied, is constructed, as shown in FIG. 1, to accommodate, in the PC server body 34, the mother board 21 composed of semiconductors, the CPUs 22, the PCI card device 27, the memory 28, the HDD 29, the power supply 210, the 5-inch device 211 being a tape device such as DAT or the like, the FD/CD drive 212, the fans 213, etc. In the illustrated example, the liquid cooling system according to an embodiment of the invention is applied to mount the heat receiving jackets 23 over the CPUs 22 on the mother board 21.

Usually, upper portions of the CPUs 22 are constructed to mount thereto a copper or aluminum thermal diffusion part generally called a heat sink, and formed with threaded holes or the like. Also, as described later, since a rack mount type equipment is limited in mount configuration, ventilation caused by the fan 213 is done in a manner to suck air from a front surface of the equipment and discharge the air from a back surface thereof. As described later, however, the provision of the fan 213 may be omitted in the case where the embodiment of the invention is applied.

The heat receiving jackets 23 constituting the liquid cooling system according to the embodiment of the invention are structured to comprise a manifold, and closely fixed to the CPUs 22 by means of threaded holes for the heat sink. The piping 24 permitting a cooling liquid to flow into and discharge from the heat receiving jackets 23 for circulation therein of the cooling liquid is taken out to the external joints 16a, 16b from the back surface panel 25. The back surface panel 25 is also provided with the connector 26 for supplying of electric power to drive a pump and a fan for an external module described later, and for giving and receiving of a control signal.

In addition, while the PC server in the illustrated example is typically provided with the two CPUs 22 and the two heat receiving jackets 23 are connected together in series, piping affording parallel cooling is also possible. Also, in the case where a more multiplicity of CPUs 22 are provided, a heat receiving jacket can be provided over each CPU.

Figure 2:
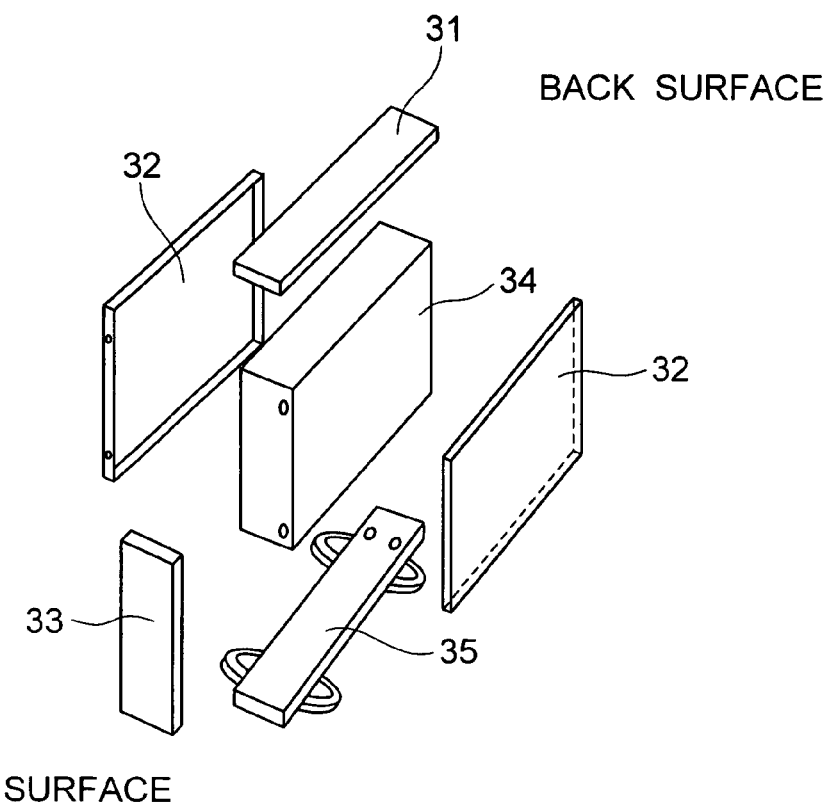
FIG. 2 is a first perspective view showing an example of mounting of the PC server of FIG. 1.
Figure 3:
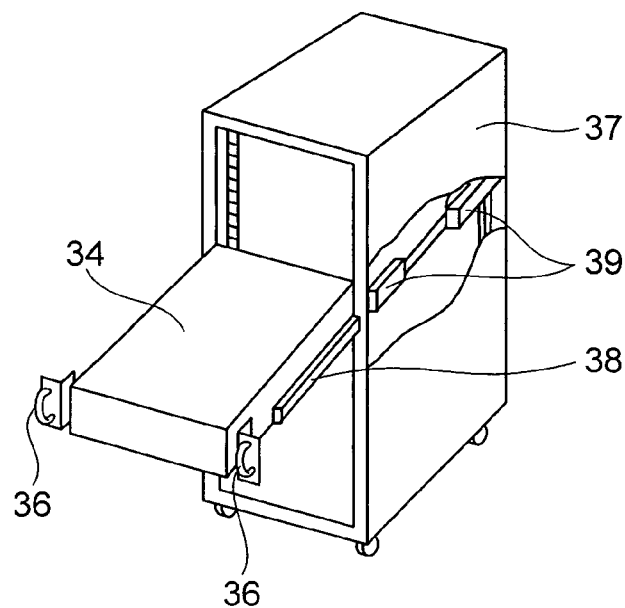
FIG. 3 is a second perspective view showing an example of mounting of the PC server of FIG. 1.

FIGS. 2 and 3 are perspective views illustrating examples of mounting of a PC server, and an explanation will be given to a configuration, in which the PC server body 34 described above is mounted, with reference to FIGS. 2 and 3. In FIGS. 2 and 3, the reference numeral 31 denotes a top plate, 32 side plates, 33 a front bezel, 35 a bottom plate, 36 mount flanges, 37 a 19-inch rack, 38 slide rails, and 39 slide rail fittings.

Mount configurations of a PC server are roughly classified into two configurations, of which a first one is called a cabinet type with a PC server installed on a floor surface, etc. as shown in FIG. 2. In this configuration, the top plate 31 made of a plastic molding material or a painted sheet metal material, the side plates 32 on both right and left sides, the bottom plate 35 with parts, such as legs for prevention of turning-over, etc., are fastened to the PC server body 34 by means of screws, hook fittings, etc. as shown in FIG. 2, and the front bezel 33 having a design and serving as a door and a cover is mounted on a front surface of the PC server body. Thereby, the PC server body 34 can be installed on a floor surface, etc.

The second configuration is one called a rack mount type, in which the PC server body is mounted on the 19-inch rack 37 as shown in FIG. 3. In this configuration, the slide rails 38 and the mount flanges 36 are fastened to the PC server body 34 and further the PC server body can be mounted in the 19-inch rack 37 through the slide rail fittings 39 provided in the 19-inch rack 37, as shown in FIG. 3.

Figure 4:
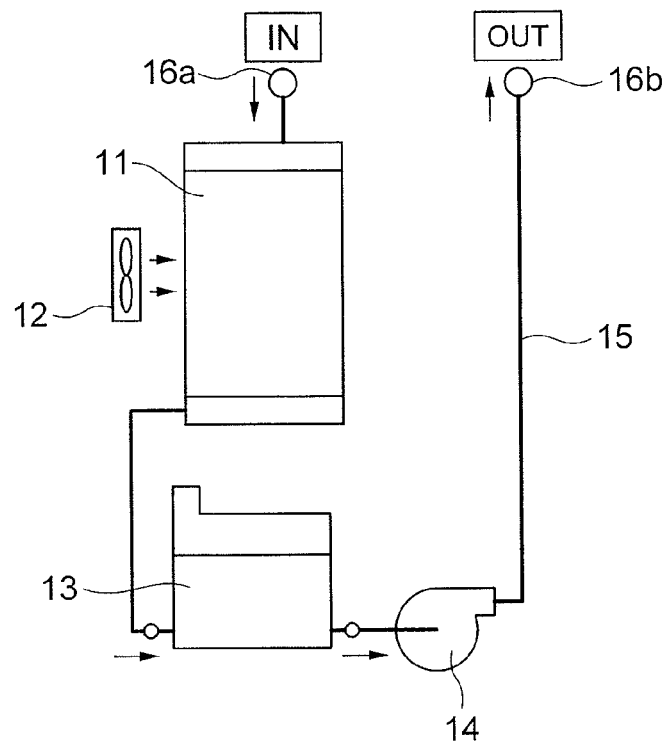
FIG. 4 is a schematic view showing a configuration of an external module of an liquid cooling system according to an embodiment of the invention.
Figure 5:
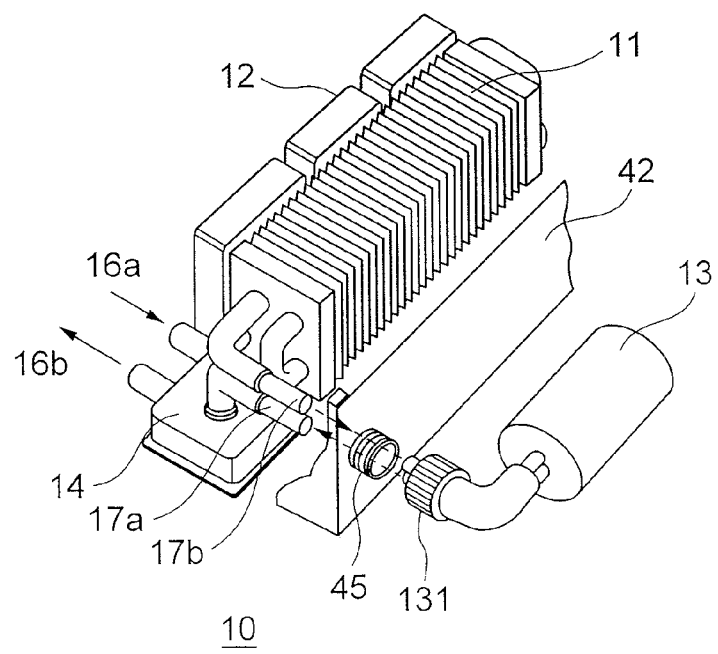
FIG. 5 is a perspective view showing the construction of an external module of a liquid cooling system according to an embodiment of the invention.

FIG. 4 is a schematic view showing the configuration of an external module of the liquid cooling system according to the embodiment of the invention, and FIG. 5 is a perspective view showing the construction of the external module of the liquid cooling system according to the embodiment of the invention. An explanation will be given below to the configuration and construction of the external module with reference to FIGS. 4 and 5. In FIGS. 4 and 5, the reference numeral 10 denotes an external module, 11 a radiator, 12 radiator cooling fans, 13 a tank, 14 a pump, 15 piping, 16a and 16b joints, 17a and 17b piping, 42 an external-unit base cover, 45 a screw fixing stud, and 131 a fixing screw.

As shown in FIGS. 4 and 5, the external module 10 of the liquid cooling system comprises the radiator 11, the radiator cooling fans 12, the tank 13 for a cooling liquid, the pump 14, and the piping 15 for connection thereof. Pipes extending from the piping 17a and 17b and made of flexible rubber, resin, or the like connect between the tank 13, and the radiator 11 and the pump 14. The tank 13 is mounted to the external-unit base cover 42, described later, by means of the screw fixing stud 45 and the fixing screw 131 provided on the tank side. A cooling liquid making use of a nonfreezing fluid such as glycol, etc. is filled in the external module 10 and circulatingly driven by the pump 14. As for heat transfer, the cooling liquid receives heat from the CPUs 22 through the heat receiving jackets 23 illustrated in FIG. 1, and is delivered to the external module 10 through the piping 24 in the PC server body and the joint 16a to be cooled by the radiator cooling fans 12 while being transported in the radiator 11. Further, the cooling liquid is transported to the pump 14 via the piping 15 and the tank 13 and further via the piping 15. Thereafter, the cooling liquid is transported to the heat receiving jackets 23 via the piping 15 and 24 from the pump. By circulating the liquid in this cycle, it is possible to efficiently radiate heat from the CPUs 22 so as to cool the CPUs 22.

The tank 13 compensates for a decrease in the cooling liquid due to volatization from rubber pipes or the like, which constitute the piping, within a service term of five years or so, and further is effective in reducing a negative pressure generated upon reduction of the cooling liquid since the cooling liquid is not fully filled and an interior of the tank is composed of the cooling liquid and an air layer. While the radiator cooling fans 12 in an example of FIG. 5 are shown as being three in number, there is no need of providing them according to circumstances for the reason described later and in case of provision, the number of the fans is optional.

Figure 6:
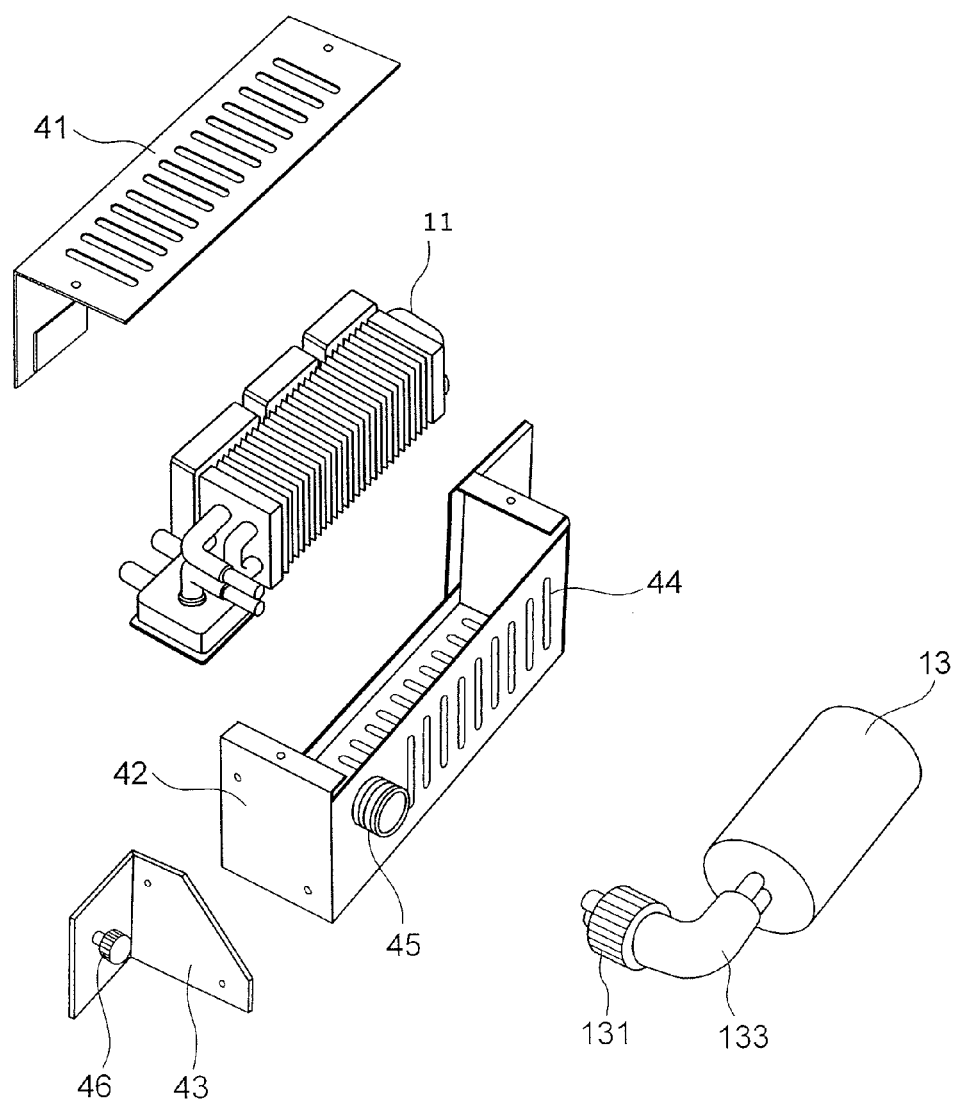
FIG. 6 is an exploded, perspective view showing the mount construction of an external module of a liquid cooling system according to an embodiment of the invention.

FIG. 6 is an exploded, perspective view showing the mount construction of an external module of a liquid cooling system according to an embodiment of the invention, and an explanation therefor will be given below. In FIG. 6, the reference numeral 41 denotes an external-unit top cover, 43 a fixing fittings, 44 inlet-exhaust ports, 46 a fixing screw, and 133 a fixing pipe, and the remaining reference numerals are the same as those in FIG. 5.

With an external module 10, an external unit composed of a radiator 11, a pump 14, and cooling fans 12 is accommodated in a housing, which is constructed by fastening an external-unit top cover 41 and the external-unit base cover 42 together by means of screws, etc. In addition, the slit-shaped inlet-exhaust ports 44 for radiation of heat from the radiator 11 are provided on an upper surface of the external-unit top cover 41 and a bottom surface and a side surface of the external-unit base cover 42, respectively. The housing, in which the external unit is accommodated, is mounted to the back surface panel 25 of the PC server body 34 with the use of the flange-shaped fixing fittings 43 and the fixing screw 46 such as thumb screw or the like.

When the housing described above is mounted to the back surface panel 25 of the PC server body 34, the external joints 16a, 16b illustrated in FIG. 1 and being connected to the heat receiving jackets 23 within the body are connected through a rectangular hole, which is provided on the external-unit base cover 41, to the piping extended from the pump 14 and the radiator 11. Also, though not shown in FIG. 6, connectors for reception of electric power and a control signal for driving of the pump 14 and the fans 12 are connected to the connector 26 provided on the back surface panel 25 of the PC server body 34.

On the other hand, the tank 13 is mounted by the screw fixing stud 45 provided on the external-unit base cover 42 of the external module and the fixing screw 131 provided on the tank. Provided on the tank 13 are the strengthened L-shaped metallic fixing pipe 133 and the fixing screw 131 on an end thereof. As illustrated in FIG. 5, pipes extending from the piping 17a and 17b and made of flexible rubber, resin, or the like connect between the tank 13, and the radiator 11 and the pump 14 while the two pipes extend through an interior of the fixing pipe 133 to be connected to the tank 13. When the fixing screw 131 and the screw fixing stud 45 are used for fixation of the tank 13, a direction, in which the tank 13 is mounted, can be made optional as described later, whereby rotational joining of the tank 13 is made possible to enable coping with a change in a configuration, in which the PC server is installed.

Figure 7:
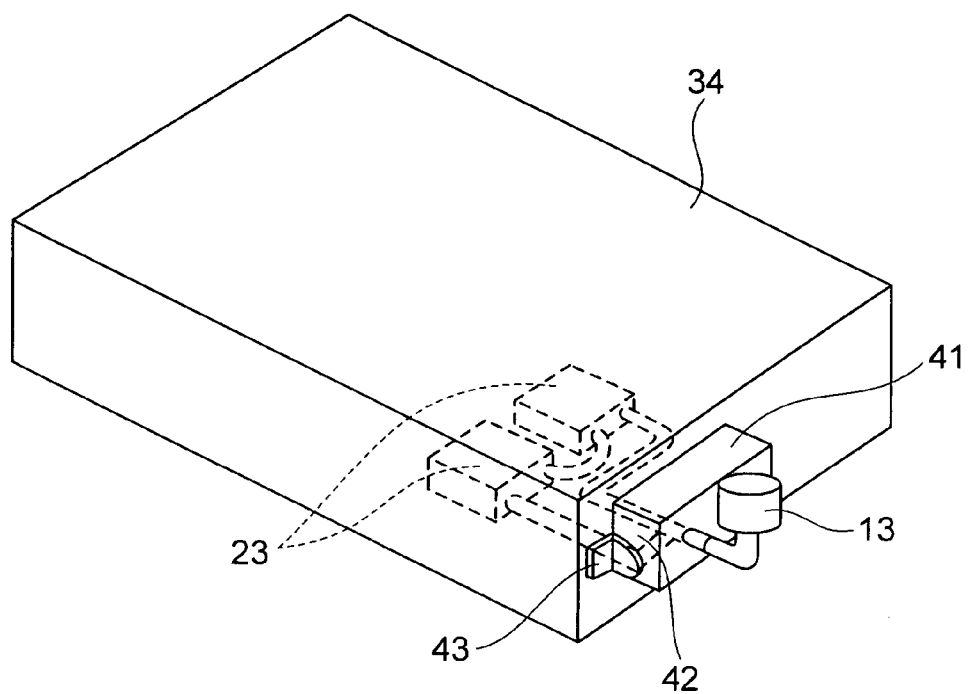
FIG. 7 is a perspective view showing a state, in which an external module of a liquid cooling system according to an embodiment of the invention is mounted to a PC server body.

FIG. 7 is a perspective view showing a state, in which the external module of the liquid cooling system according to the embodiment of the invention described above is mounted to the PC server body 34. An example shown in FIG. 7 corresponds to the case where the PC server body is mounted on a rack mount type equipment.

As shown in FIG. 7, the external module 10 described above is mounted on the back surface of the PC server body 34. In the configuration shown in FIG. 7, the fan 213 and the radiator cooling fans 12, respectively, are mounted in the PC server body 34 and on the external module 10, as seen from the above description. Since the external module 10 is mounted about the exhaust port of the PC server body 34, however, the fans are not necessarily present in two locations in the light of a scale being cooled and an air volume of the fans, such that the fan 213 provided in the PC server body 34 is removed and the radiator cooling fans 12 of the external module 10 can also serve for internal cooling of the PC server body 34. Also, conversely, the radiator cooling fans 12 for the radiator 11 of the external module 10 are removed and the fan 213 provided in the PC server body 34 can also serve for cooling of the radiator 11. Further, in the case where heat generated in the PC server body 34 is relatively small, it is possible to dispense with the fan 213 and the radiator cooling fans 12, respectively, provided in the PC server body 34 and on the external module 10. In this case, it suffices to radiate heat from the radiator by natural convection of air from the inlet-exhaust ports 44 provided on the cover, which covers the radiator 11, so that only electric power for driving of the pump is needed and energy saving can be achieved for the whole PC server.

Also, with the configuration shown in FIG. 7, by joining the tank 13 and the external module 10 together by means of, for example, a vinyl tube, which makes the piping on a side of the tank 13, and metallic material, which makes the piping on a side of the external module 10, and removing the fixing screw 131, such connection can expose the connecting portions so as to enable making an exchange of the tank 13 easily. Accordingly, it is possible to easily carry out on-site installation of the tank and supply of the liquid for the sake of avoiding mixing of bubbles into the cooling liquid, caused by vibrations in transport, to easily make an exchange of the tank 13 at the time of failure, and to easily pour an additional liquid at the time of rapid reduction in the cooling liquid.

The embodiment of the invention has been described above, in which piping between the tank 13 and the external module 10 is achieved by joining the vinyl tube on the side of the tank 13, to the metallic pipes on the side of the external module 10, and the piping between the external module 10 and the PC server body 34 is connected through the joints 16a, 16b. However, the piping between the external module 10 and the PC server body 34 may be connected by joining vinyl tubes on the side of the external module 10, to a metallic pipe on the side of the PC server, and both of the piping between the tank 13 and the external module 10 and the piping between the external module 10 and the PC server body may be achieved by means of joints.

Figure 8:
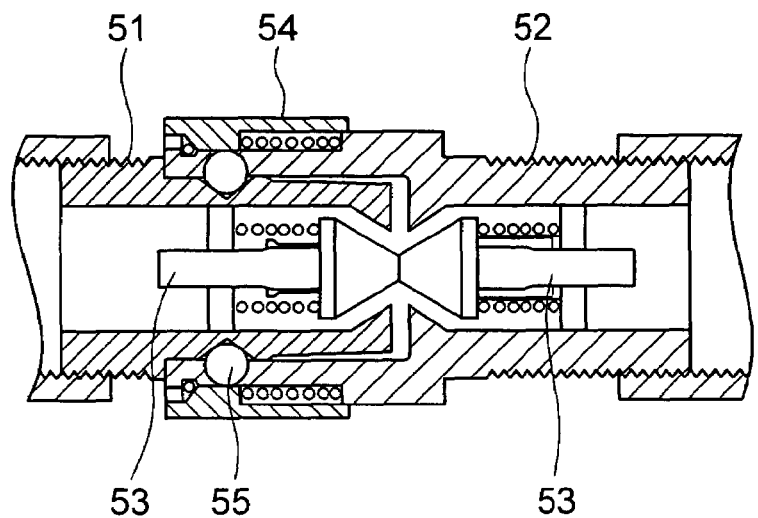
FIG. 8 is a cross sectional view showing an example of a structure of a valved joint usable as a joint.

FIG. 8 is a cross sectional view showing an example of the structure of a valved joint usable as a joint. In FIG. 8, the reference numeral 51 denotes a male socket, 52 a female socket, 53 lock pins, 54 a lock ring, and 55 a sealing ring. The example shown in FIG. 8 is an exemplary valved joint 16, and many kinds of such joints are known and have substantially the structure as shown in FIG. 8.

The joint shown in FIG. 8 is composed of the female socket 52 and the male socket 51, in interiors of which are provided the lock pins 53. When the two sockets are independent from each other, that is, when connection is not made, the lock pins 53 in the form of a trigonal pyramid are pushed toward tip ends thereof by spring force so as to plug a flow passage of the cooling liquid and inhibit leakage the liquid outside. Upon insertion of the male socket 51 into the female socket 52, both sockets are fixed in a position about the sealing ring 55 by the lock ring 54 and simultaneously therewith both of the lock pins 53 collide against each other to be moved with the result that the flow passage will be opened. It suffices to connect tubular pipes to outsides of the male socket 51 and the female socket 52.

Figure 9:
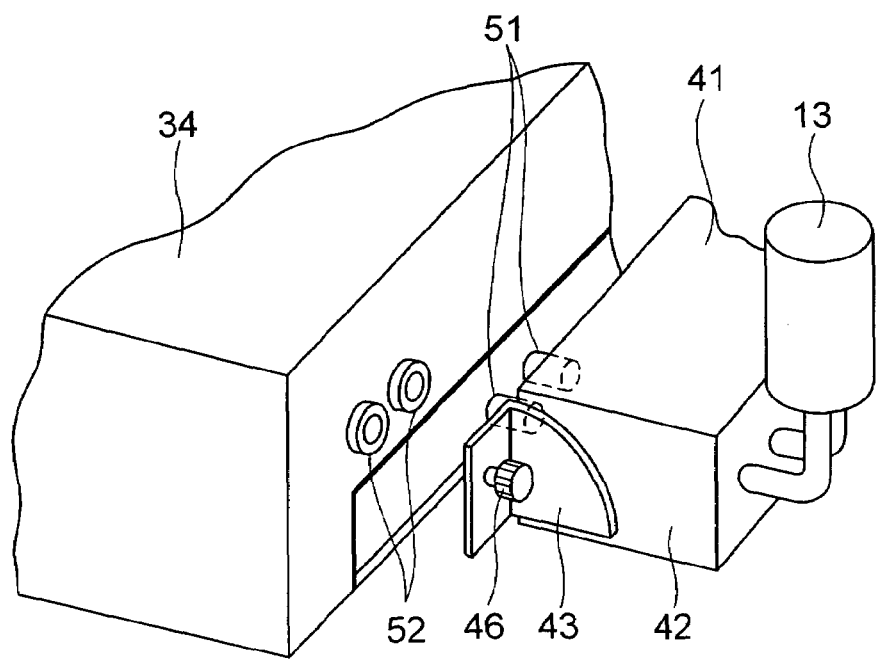
FIG. 9 is a view illustrating a way to mount an external module to a PC server body in case of using the valved joint shown in FIG. 8.

FIG. 9 is a view illustrating a way to mount the external module 10 to the PC server body 34 in case of using the valved joint 16 shown in FIG. 8, and an explanation therefor will be given below.

The external module 10 is fixed to the back surface panel 25 of the PC server body 34 by means of the fixing screw 46 on the fixing fittings 43 described above. The two female sockets 52 are mounted on the back surface panel 25 of the PC server body 34 and the two male sockets 51 are mounted on the external module 10. In this manner, when the female sockets 52 and the male sockets 51 are positioned relative to each other in mounting the external module 10 to the back surface panel 25, the pipes are connected together simultaneously with joining of the external module 10 to enable an improvement in operability.

Figure 10:
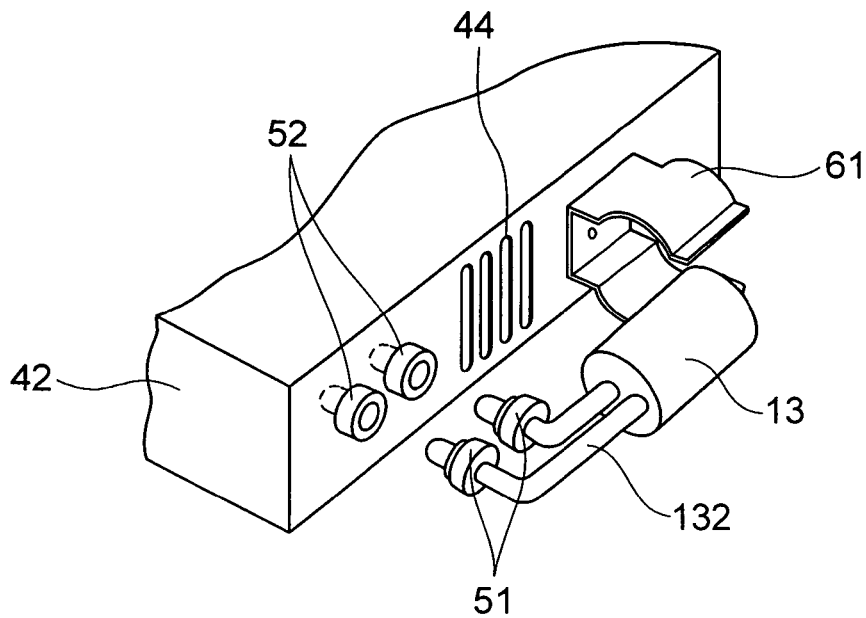
FIG. 10 is a view illustrating a first way to mount a tank to an external module in case of using the valved joint shown in FIG. 8.
Figure 11:
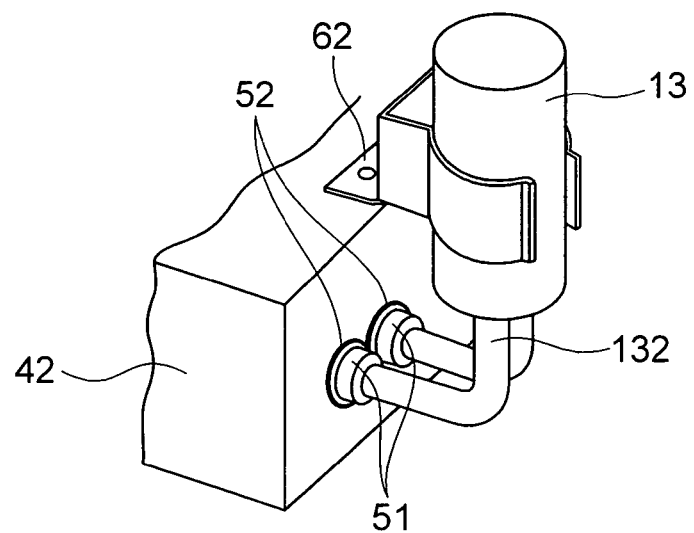
FIG. 11 is a view illustrating a second way to mount a tank to an external module in case of using the valved joint shown in FIG. 8.

FIGS. 10 and 11 are views illustrating ways to mount the tank 13 to the external module 10 in case of using the valved joint 16 shown in FIG. 8, and an explanation therefor will be given below.

In the same manner as that illustrated with reference to FIG. 9, the two female sockets 52, respectively, are mounted on the external module 10 and the two male sockets 51 are mounted on the tank 13. The fixing pipe 133, described above, on the tank 13 is not used but two flexible tubes 132 provided inside are joined directly to the male sockets 51. With the configuration described above, the metallic fixing pipe 133 is mounted to the tank 13 to provide for strength to enable making the tank 13 self-supporting. With the examples shown in FIGS. 10 and 11, the two pipes on the tank 13 comprise the flexible vinyl tubes for the sake of joining to the valved joints 16 to be unable to provide for strength, so that it is not possible to make the tank 13 self-supporting. Therefore, in the examples shown in FIGS. 10 and 11, the tank 13 is held by holding fittings 61 or 62.

The example shown in FIG. 10 is for the case where the PC server body 34 is used as a cabinet type one in a vertical position, in which case the horizontal tank holding fittings 61 are mounted to the external-unit base cover 42 to hold the tank 13. Also, the example shown in FIG. 11 is for the case where the PC server body 34 is used as a rack mount type one in a horizontal position in the rack, in which case the vertical tank holding fittings 62 are mounted to the external-unit base cover 42 to hold the tank 13. Such mounting of the tank 13 makes it possible to improve the operability in exchange of the tank 13.

According to the embodiment of the invention, since parts constituting a liquid cooling system can be composed of only heat receiving jackets and piping in a housing of an electronic equipment provided with the liquid cooling system, it is possible to take over a housing structure of an air-cooling system, etc. of the conventional technique without having any influence on cooling of packaged devices except an object for liquid cooling.

Also, according to the embodiment of the invention, since a tank for a cooling liquid can be detachably mounted on a liquid cooling system, it is possible to achieve an improvement in quality of maintenance and exchange and in safety in transport and to maintain a distance between the liquid surface and an inlet port of the tank and a distance between the liquid surface and an exhaust port thereof constant irrespective of a direction, in which an electronic equipment is installed, so that it is possible to prevent mixing of air into a cooling liquid and to maintain the cooling capacity even with a small-sized pump, irrespective of the direction, in which the electronic equipment is installed.

Further, according to the embodiment of the invention, since a fan for an electronic equipment body can be made use of for cooling of a radiator, it is possible to achieve mounting to a housing of an electronic equipment, which is limited in a mounted position. Also, since cooling components outside a housing of an electronic equipment are detachably structured, it is possible to shorten time for exchange of the components and to prevent liquid spill into the electronic equipment at the time of exchange.

According to the invention, it is possible to take over a housing structure of an air-cooling system, etc. of the conventional technique without having any influence on cooling of packaged devices in an electronic equipment except an object for liquid cooling, to prevent mixing of air into a cooling liquid and to maintain the cooling capacity even with a small-sized pump, irrespective of a direction, in which the electronic equipment is installed.

Also, according to the invention, it is possible to shorten time for exchange of liquid cooling components outside a housing of an electronic equipment and a cooling liquid tank and to prevent liquid spill into the electronic equipment at the time of exchange.

It should be further understood by those skilled in the art that the foregoing description has been made on embodiments of the invention and that various changes and modifications may be made in the invention without departing from the spirit of the invention and the scope of the appended claims.

The invention claimed is:

1. A liquid cooling system for cooling of a heat generating element included in an electronic equipment, comprising:
    a heat receiving jacket, which is mounted to the heat generating element and to which piping extended outside the electronic equipment is connected; and
    a cooling module mounted externally to a housing of the electronic equipment and comprising a radiator, a cooling-liquid tank, a pump, and piping joined to them for circulation therethrough of cooling liquid;
    wherein the cooling-liquid tank is rotatably connected to the cooling module so as to be held in one of a horizontal position and a vertical position;
    wherein the pump circulates the cooling liquid through the heat receiving jacket, the radiator, and the cooling-liquid tank to cause the radiator to cool that cooling liquid, which has absorbed heat in the heat receiving jacket and
    wherein the cooling module is mounted externally to a back portion of the electronic equipment so as to be detachably mounted to the housing of the electronic equipment.

2. The liquid cooling system according to claim 1, wherein a valved joint is provided on a portion of the piping, by which the heat receiving jacket is connected to the cooling module.

3. The liquid cooling system according to claim 1, wherein the radiator is cooled by discharge air of a fan provided inside the electronic equipment, or a cooling fan of the cooling module.

4. The liquid cooling system according to claim 1, wherein the heat generating element is a CPU.

5. A liquid cooling system for cooling of a heat generating element included in an electronic equipment, comprising:
    a heat receiving jacket, which is mounted to the heat generating element and to which piping extended outside the electronic equipment is connected;
    a cooling module mounted externally to a housing of the electronic equipment and comprising a radiator, a pump, and piping joined to them for circulation therethrough of cooling liquid; and
    a cooling-liquid tank rotatably mounted externally to the cooling module in one of a horizontal and vertical position in accordance with a mounting configuration of the electronic equipment and joined to the cooling module through the piping;
    wherein the pump circulates the cooling liquid through the heat receiving jacket, the radiator, and the cooling-liquid tank to cause the radiator to cool the cooling liquid, which has absorbed heat in the heat receiving jacket;
    wherein the cooling module and the cooling-liquid tank are detachably mounted to the housing of the electronic equipment; and
    wherein the cooling-liquid tank is detachably mounted to the cooling module.

6. The liquid cooling system according to claim 5, wherein valved joints are provided on a portion of the piping, by which the heat receiving jacket is connected to the cooling module, and on a portion of the piping connected to the cooling-liquid tank, and
    the cooling module and the cooling-liquid tank are detachably mounted externally to a back portion of the electronic equipment.

7. The liquid cooling system according to claim 5, wherein the piping joined to the radiator and the pump for circulation therethrough of the cooling liquid comprises a metallic pipe.

8. The liquid cooling system according to claim 5, wherein the cooling-liquid tank comprises a valved joint, by which it is rotatably connected to the cooling module.

9. The liquid cooling system according to claim 5, wherein the heat generating element is a CPU.

10. An information processing apparatus with a heat generating element, comprising:
    a heat receiving jacket, which is mounted to the heat generating element and to which piping extended outside the information processing apparatus is connected; and
    a cooling module, which comprises a radiator, a cooling-liquid tank, and a pump, joined to them for circulation therethrough of a cooling liquid, and circulates the cooling liquid to cause the radiator to cool that cooling liquid, which has absorbed heat in the heat receiving jacket;
    wherein the cooling-liquid tank is rotatably connected to the cooling module so as to be held in a horizontal position when the information processing apparatus is of a cabinet type and to be held in a vertical position when the information processing apparatus is of a rack mount type; and
    wherein the cooling module is detachably mounted externally to a housing of the information processing apparatus.

11. The information processing apparatus according to claim 10, wherein the cooling module is mounted externally to a back portion of the information processing apparatus.

12. The information processing apparatus according to claim 10, wherein a valved joint is provided on a portion of the piping, by which the heat receiving jacket is connected to the cooling module, and
    the cooling module is detachably mounted externally to a back portion of the information processing apparatus.

13. The information processing apparatus according to claim 10, wherein the radiator is cooled by discharge air of a fan provided inside an electronic equipment, or a cooling fan of the cooling module.

* * * * *